US007386414B2

(12) United States Patent
Aguilar, Jr. et al.

(10) Patent No.: US 7,386,414 B2
(45) Date of Patent: Jun. 10, 2008

(54) GENERATION OF HARDWARE THERMAL PROFILES FOR A SET OF PROCESSORS

(75) Inventors: Maximino Aguilar, Jr., Georgetown, TX (US); Charles Ray Johns, Austin, TX (US); Mark Richard Nutter, Austin, TX (US); James Michael Stafford, Liberty Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/289,066

(22) Filed: Nov. 29, 2005

(65) Prior Publication Data

US 2007/0124100 A1    May 31, 2007

(51) Int. Cl.
G06F 11/34    (2006.01)
G06F 17/00    (2006.01)

(52) U.S. Cl. .................. 702/130; 702/136; 702/132; 702/186; 713/320

(58) Field of Classification Search ................ 702/130, 702/136
See application file for complete search history.

(56) References Cited

U.S. PATENT DOCUMENTS

| 5,175,852 | A | 12/1992 | Johnson et al. |
| 5,469,560 | A | 11/1995 | Beglin |
| 5,778,384 | A | 7/1998 | Provino et al. |
| 5,953,536 | A | 9/1999 | Nowlin, Jr. |
| 6,029,119 | A * | 2/2000 | Atkinson .................. 702/132 |
| 6,564,328 | B1 | 5/2003 | Grochowski et al. |
| 6,776,817 | B2 | 8/2004 | Lentz et al. |
| 2003/0110012 | A1 | 6/2003 | Orenstien et al. |
| 2003/0158697 | A1 | 8/2003 | Gold et al. |
| 2003/0177107 | A1 | 9/2003 | Brown et al. |
| 2003/0229662 | A1 | 12/2003 | Luick |
| 2005/0216222 | A1 * | 9/2005 | Inoue ......................... 702/136 |
| 2005/0216775 | A1 * | 9/2005 | Inoue ......................... 713/300 |
| 2005/0228618 | A1 | 10/2005 | Patel et al. |
| 2005/0246558 | A1 * | 11/2005 | Ku .............................. 713/300 |
| 2006/0005083 | A1 | 1/2006 | Genden et al. |
| 2006/0041766 | A1 | 2/2006 | Adachi |
| 2006/0101289 | A1 * | 5/2006 | Dang et al. ................. 713/300 |

FOREIGN PATENT DOCUMENTS

EP    1182538 A2    2/2002

(Continued)

OTHER PUBLICATIONS

No date, Aguilar, Jr. et al.

(Continued)

*Primary Examiner*—Hal D Wachsman
(74) *Attorney, Agent, or Firm*—Duke W. Yee; D'Ann N. Rifai; Mari A. Stewart (57) ABSTRACT

A computer implemented method, data processing system, and computer usable code are provided for generation of hardware thermal profiles for a set of processors. Sampling is performed of the thermal states of the set of processors during the execution of a set of workloads to create sampled information. The sampled information and thermal characteristics of the set of processors are combined and a thermal index is generated based on the sampled information and characteristics of the set of processors.

3 Claims, 6 Drawing Sheets

FOREIGN PATENT DOCUMENTS

WO        2005093564 A2    10/2005

OTHER PUBLICATIONS

U.S. Appl. No. 11/289,248, filed Nov. 29, 2005, Aguilar, Jr. et al.
U.S. Appl. No. 11/289,087, filed Nov. 29, 2005, Aguilar, Jr. et al.
U.S. Appl. No. 11/289,090, filed Nov. 29, 2005, Aguilar, Jr. et al.
U.S. Appl. No. 11/289,088, filed Nov. 29, 2005, Aguilar, Jr. et al.
U.S. Appl. No. 11/289,089, filed Nov. 29, 2005, Aguilar, Jr. et al.
U.S. Appl. No. 11/381,373, filed May 3, 2006, Aguilar, Jr. et al.
U.S. Appl. No. 11/381,380, filed May 3, 2006, Aguilar, Jr. et al.
U.S. Appl. No. 11/381,386, filed May 3, 2006, Aguilar, Jr. et al.
U.S. Appl. No. 11/381,391, filed May 3, 2006, Aguilar, Jr. et al.
U.S. Appl. No. 11/425,453, filed Jun. 21, 2006, Johns et al.
U.S. Appl. No. 11/425,455, filed Jun. 21, 2006, Johns et al.
U.S. Appl. No. 11/425,459, filed Jun. 21, 2006, Johns et al.
U.S. Appl. No. 11/425,462, filed Jun. 21, 2006, Johns et al.
U.S. Appl. No. 11/425,472, filed Jun. 21, 2006, Johns et al.
U.S. Appl. No. 11/425,483, filed Jun. 21, 2006, Johns et al.
U.S. Appl. No. 11/425,492, filed Jun. 21, 2006, Johns et al.
U.S. Appl. No. 11/425,499, filed Jun. 21, 2006, Johns et al.
http://www.m-w.com/dictionary/sense pp. 1-2 retrieved Dec. 11, 2006.
http://en.wikipedia.org/wiki/Central_processing_unit, pp. 1-13, retrieved Dec. 26, 2006.
Smith, "Measuring temperatures on computer chips with speed and accuracy", Analog Dialogue 33-4, (1999 Analog Devices), pp. 1-5.

* cited by examiner

GENERATION OF HARDWARE THERMAL PROFILES FOR A SET OF PROCESSORS

BACKGROUND

1. Field of the Invention

The present application relates generally to thermal profiles and in particular to thermal profiles for processors. Still more particularly, the present application relates a computer implemented method, data processing system, and computer usable code for generation of a hardware thermal profile for a multi-core system.

2. Description of the Related Art

The first-generation Cell processor is a multi-core chip comprised of a 64-bit Power PC® processor core and eight synergistic processor cores, capable of massive floating point processing, optimized for compute-intensive workloads and broadband rich media applications. A high-speed memory controller and high-bandwidth bus interface are also integrated on-chip. Cell's breakthrough multi-core architecture and ultra high-speed communications capabilities deliver vastly improved, real-time response, in many cases ten times the performance of the latest PC processors. Cell is operating system neutral and supports multiple operating systems simultaneously. Applications for this type of processor range from a next generation of game systems with dramatically enhanced realism, to systems that form the hub for digital media and streaming content in the home, to systems used to develop and distribute digital content, and to systems to accelerate visualization and supercomputing applications.

Today's high performance multi-core processors are frequently limited by thermal considerations. Typical solutions include cooling and power management. Cooling may be expensive and/or difficult to package. Power management is generally a coarse action, "throttling" much if not all of the processor in reaction to a thermal limit being reached. Other techniques such as thermal management help address these coarse actions by only throttling the units exceeding a given temperature. Even with the improvement of Thermal management, it would be beneficial for the system to have a method of profiling an application to prevent the processor from being throttled.

SUMMARY

The different aspects of the present invention provide a computer implemented method, data processing system, and computer usable code for generation of hardware thermal profiles for a set of processors. Thermal states of a set of processors are sampled during the execution of a set of workloads to create sampled information. The sampled information is combined with thermal characteristics of the set of processors. A thermal index is generated based on the sampled information and the characteristics of the set of processors.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
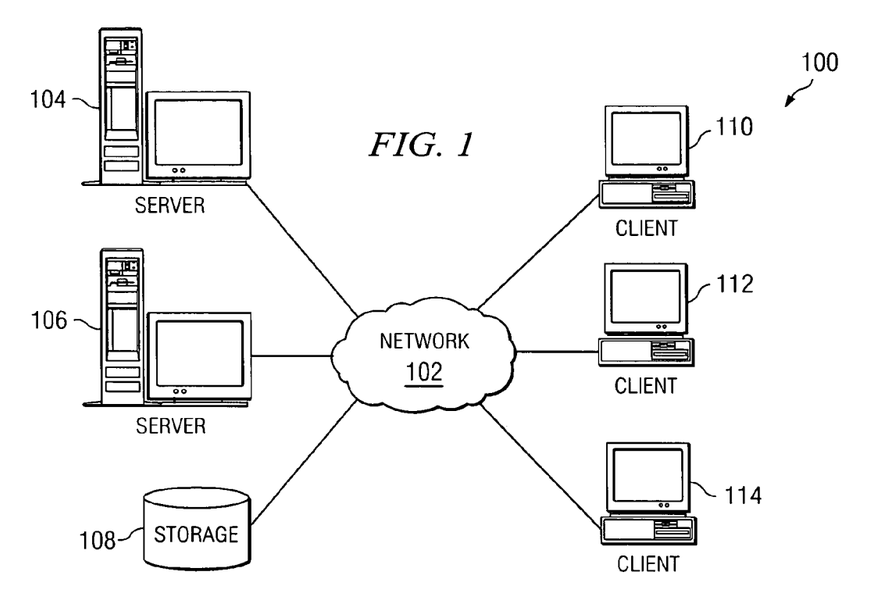
FIG. 1 depicts a pictorial representation of a network of data processing systems in which aspects of the illustrative embodiments may be implemented.
Figure 2:
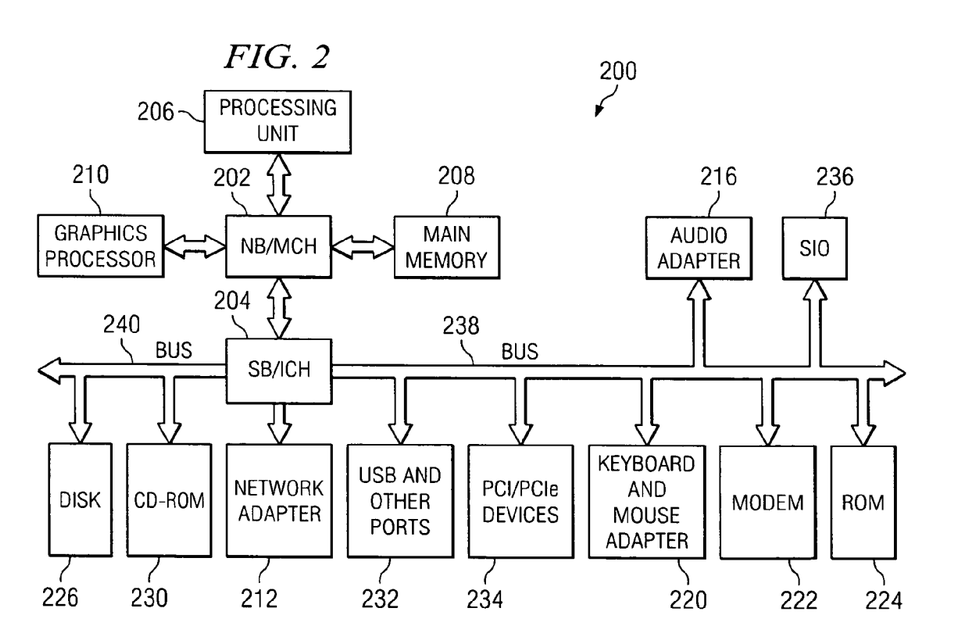
FIG. 2 depicts a block diagram of a data processing system is shown in which aspects of the illustrative embodiments may be implemented.

The illustrative embodiments relate to the generation of hardware thermal profiles for a set of processors for a multi-core system. FIGS. 1-2 are provided as exemplary diagrams of data processing environments in which the illustrative embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the illustrative embodiments.

With reference now to the figures, FIG. 1 depicts a pictorial representation of a network of data processing systems in which aspects of the illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102.

These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different illustrative embodiments.

With reference now to FIG. 2, a block diagram of a data processing system is shown in which aspects of the illustrative embodiments may be implemented. Data processing system 200 is an example of a computer, such as server 104 or client 110 in FIG. 1, in which computer usable code or instructions implementing the processes for illustrative embodiments may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor,210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for the illustrative embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
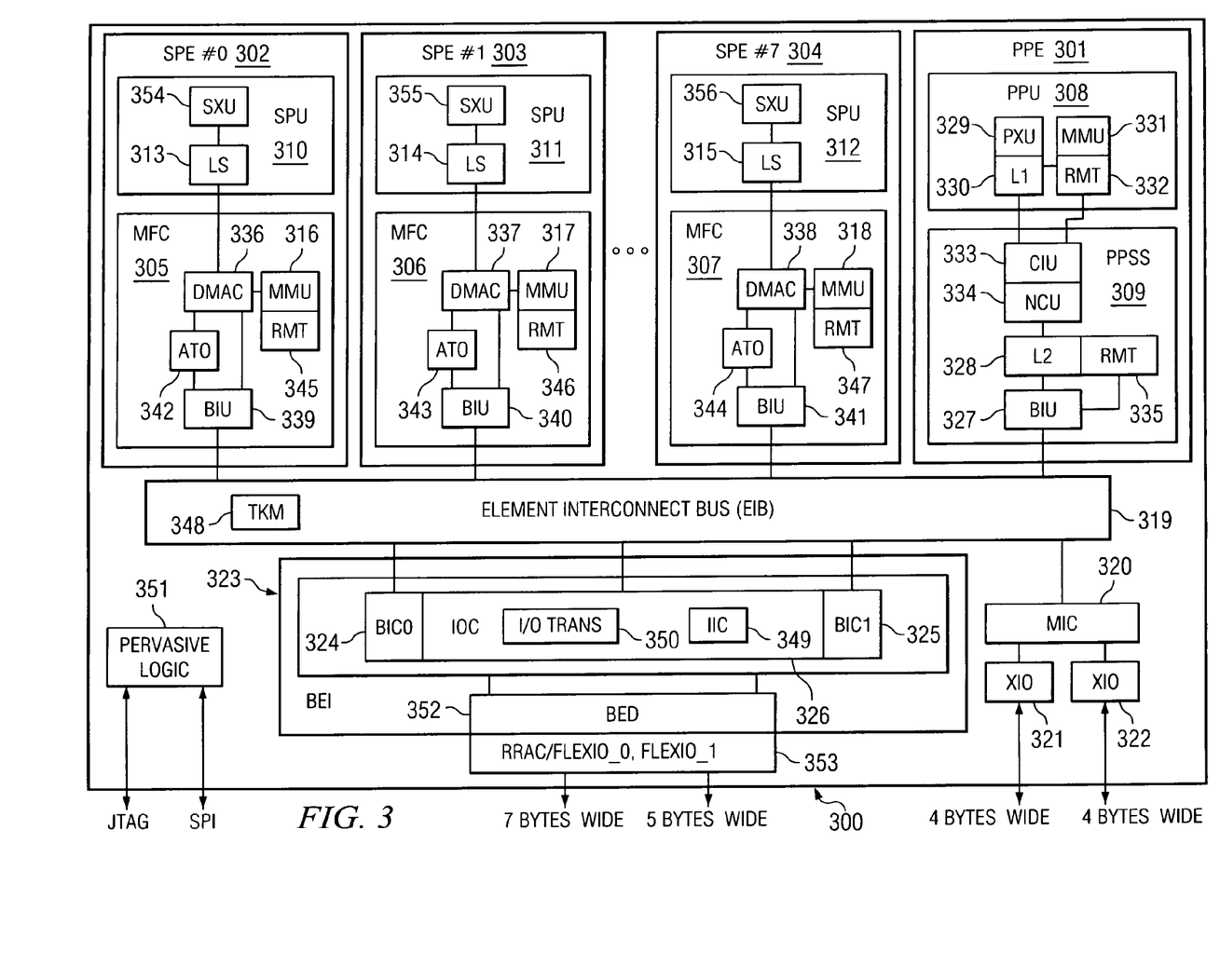
FIG. 3 is an exemplary diagram of a cell broadband engine chip in which the illustrative aspects may be implemented in accordance with an illustrative embodiment.

FIG. 3 is an exemplary diagram of a cell broadband engine chip in which aspects of the illustrative embodiments may be implemented in accordance with an illustrative embodiment. Cell broadband engine chip 300 is a single-chip multiprocessor implementation directed toward distributed processing targeted for media-rich applications such as game consoles, desktop systems, and servers.

Cell broadband engine chip 300 may be logically separated into the following functional components: Power PC® processor element (PPE) 301, synergistic processor units (SPU) 310, 311, and 312, and memory flow controllers (MFC) 305, 306, and 307. Although synergistic processor elements and Power PC® processor elements are shown by example, any type of processor element may be supported.

Exemplary cell broadband engine chip 300 implementation includes one Power PC® processor element 301 and eight synergistic processor elements, although FIG. 3 shows only three synergistic processor elements (SPEs) 302, 303, and 304. The synergistic processor element (SPE) of a CELL Processor is a first implementation of a new processor architecture designed to accelerate media and data streaming workloads.

Each synergistic processor element includes one synergistic processor unit (SPU) 310, 311, or 312 with its own local store (LS) area 313, 314, or 315 and a dedicated memory flow controller (MFC) 305, 306, or 307 that has an associated memory management unit (MMU) 316, 317, or 318 to hold and process memory protection and access permission information. Once again, although synergistic processor units are shown by example, any type of processor unit may be supported. Additionally, cell broadband engine chip 300 implements element interconnect bus (EIB) 319 and other I/O structures to facilitate on-chip and external data flow.

Element interconnect bus 319 serves as the primary on-chip bus for Power PC® processor element 301 and synergistic processor elements 302, 303, and 304. In addition, element interconnect bus 319 interfaces to other on-chip interface controllers that are dedicated to off-chip accesses. The on-chip interface controllers include the memory interface controller (MIC) 320, which provides two extreme data rate I/O (XIO) memory channels 321 and 322, and cell broadband engine interface unit (BEI) 323, which provides two high-speed external I/O channels and the internal interrupt control for the cell broadband engine 300. The cell broadband engine interface unit 323 is implemented as bus interface controllers (BICO & BICl) 324 and 325 and I/O interface controller (IOC) 326. The two high-speed external I/O channels connected to a polarity of RRAC interfaces providing the flexible input and output (FlexIO_0 & FlexIO_1) 353 for the cell broadband engine 300.

Each synergistic processor unit 310, 311, or 312 has a corresponding local store area 313, 314, or 315 and synergistic execution units (SXU) 354, 355, or 356. Each individual synergistic processor unit 310, 311, or 312 can execute instructions (including data load and store operations) only from within its associated local store area 313, 314, or 315. For this reason, all required data transfers to or from storage elsewhere in a system is performed using memory flow controller direct memory access operations via synergistic processor unit's 310, 311, and 312 dedicated memory flow controllers 305, 306, and 307.

A program running on synergistic processor unit 310, 311, or 312 only references its own local store area 313, 314, or 315 using a local store address. However, each synergistic processor unit's local store area 313, 314, or 315 is also assigned a real address (RA) within the overall system's memory map. This allows privileged software to map a local store area to the effective address (EA) of a process to facilitate direct memory access transfers between the local store of one synergistic processor unit and the local store of another synergistic processor unit. Power PC® processor element 301 may also directly access any synergistic processor unit's local store using an effective address.

The memory flow controller direct memory access data transfer commands always use one local store address and one effective address. The local store address directly addresses the local store memory of the associated synergistic processor unit 310, 311, or 312 corresponding to the memory flow controller command queues on which the direct memory access command request is placed. However, the effective address may be arranged to access any other memory storage area in the system, including local store areas 313, 314, and 315 of the other synergistic processor elements 302, 303, and 304.

Main storage is shared by Power PC® processor unit 308, the power processor element (PPE) 301, synergistic processor elements (SPEs) 302, 303, and 304, and I/O devices in a system. All information held in this level of storage is visible to all processors and devices in the system. Programs reference this level of storage using an effective address. Since the memory flow controller synergistic processor unit command queue and the memory flow controller proxy command queue and control and status facilities are mapped to the effective address space, it is possible for power processor element 301 to initiate direct memory access operations involving a local store area associated with any of synergistic processor elements (SPEs) 302, 303, and 304.

A synergistic processor unit program accesses main storage by generating and placing a direct memory access data transfer command, with the appropriate effective address and local store address, into its memory flow controllers (MFCs) 305, 307, or 307 command queue for execution. When executed, the required data are transferred between its own local store area and main storage. Memory flow controllers (MFCs) 305, 306, or 307 provide a second proxy command queue for commands generated by other devices such as the power processor element (PPE) 301. The proxy command queue is typically used to store a program in local storage prior to starting the synergic processor unit. Proxy commands can also be used for context store operations.

The effective address part of the data transfer is much more general, and can reference main storage, including all synergistic processor unit local store areas. These local store areas are mapped into the effective address space. The data transfers are protected. An effective address is translated to a real address through a memory management unit. The translation process allows for virtualization of system memory and memory protection.

Power PC® processor element 301 on cell broadband engine chip 300 consists of 64-bit Power PC® processor unit 308 and Power PC® storage subsystem 309. Power PC® processor unit 308 contains processor execution unit (PXU) 329, level 1 (L1) cache 330, memory management unit (MMU) 331 and replacement management table (RMT) 332. Power PC® storage subsystem 309 consists of cacheable interface unit (CIU) 333, non-cacheable unit (NCU) 334, level 2 (L2) cache 328, replacement management table (RMT) 335 and bus interface unit (BIU) 327. Bus interface unit 327 connects Power PC® storage subsystem 309 to the element interconnect bus 319.

Synergistic processor unit 310, 311, or 312 and memory flow controllers 305, 306, and 307 communicate with each other through unidirectional channels that have capacity. The channel interface transports messages to and from memory flow controllers 305, 306, and 307, synergistic processor units 310, 311, and 312. Bus interface units 339, 340, and 341 connect memory flow controllers 305, 306, and 307 to element interconnect bus 319.

Memory flow controllers 305, 306, and 307 provide two main functions for synergistic processor units 310, 311, and 312. Memory flow controllers 305, 306, and 307 move data between synergistic processor unit's 310, 311, or 312 local store area 313, 314, and 315 and main storage. Additionally, memory flow controllers 305, 306, and 307 provide synchronization facilities between synergistic processor units 310, 311, and 312 and other devices in the system.

Memory flow controllers 305, 306, and 307 implementation has four functional units: direct memory access controllers (DMAC) 336, 337, and 338, memory management units (MMU) 316, 317, and 318, atomic units (ATO) 342, 343, and 344, replacement management tables (RMT) 345, 346, and 347, and bus interface units (BIU) 339, 340, and 341. Direct memory access controllers 336, 337, and 338 maintains and processes memory flow controller command queues (MFC CMDQs), which consist of a memory flow controller synergistic processor unit command queue (MFC SPUQ) and a memory flow controller proxy command queue (MFC PrxyQ). The sixteen-entry, memory flow controller synergistic processor unit command queue handles memory flow controller commands coming from the synergistic processor unit channel interface. The eight-entry, memory flow controller proxy command queue processes memory flow controller commands coming from other devices through memory mapped input and output (MMIO) load and store operations. A typical direct memory access command moves data between the local store and the main storage. The main storage is addressed by the effective address direct memory access command operand. The local store is addressed by the local store address (LSA) direct memory access command operand.

In a virtual mode, memory management units 316, 317, and 318 provides the address translation and memory protection facilities to handle the effective address translation request from direct memory access controllers 336, 337, and 338 and send back the translated address. Each synergistic memory management unit maintains a segment lookaside buffer (SLB) and a translation lookaside buffer (TLB). The segment lookaside buffer translates an effective address to a virtual address (VA) and the translation lookaside buffer translates the virtual address coming out of the segment lookaside buffer to a real address.

Atomic units 342, 343, and 344 provide the level of data caching necessary for maintaining synchronization with other processing units in the system. Coherency with other caches in the system is maintained. Atomic direct memory access commands provide the means for the synergist processor elements to request synchronization with other units.

The main function of bus interface units 339, 340, and 341 is to provide the synergistic processor elements 302, 303, and 304 with an interface to the element interconnect bus.

Figure 10:
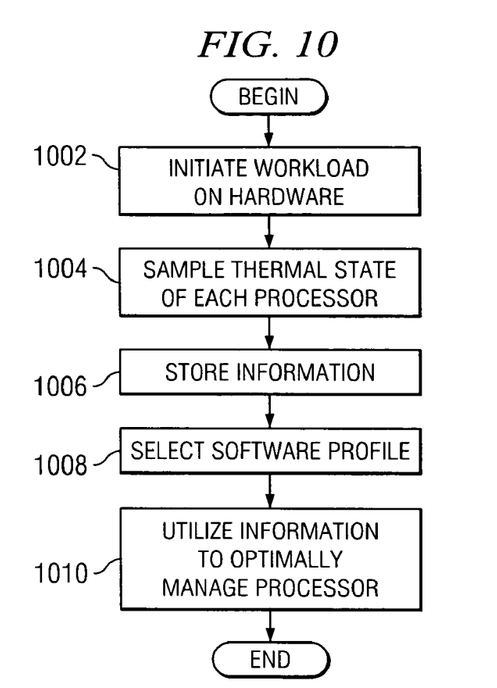
FIG. 10 is a flow diagram depicting the operation for generation of a hardware thermal profile for a multi-core processor in accordance with an illustrative embodiment.
Figure 11:
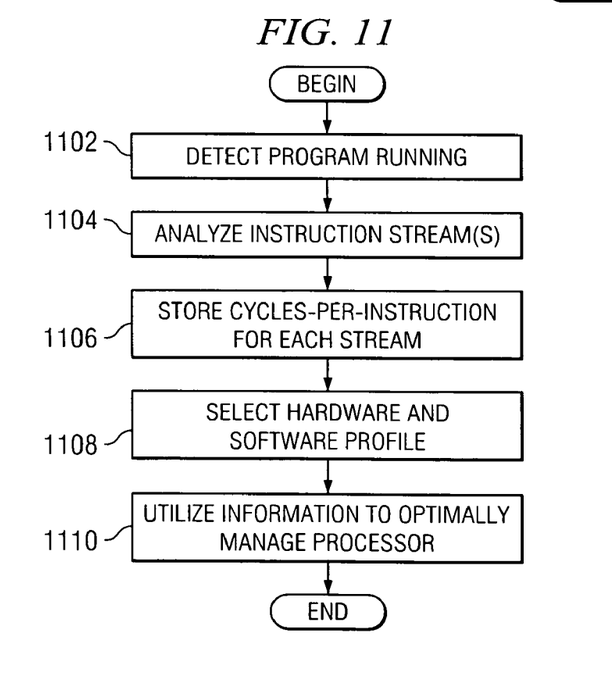
FIG. 11 is a flow diagram depicting the operation for generation of a software thermal profile for optimal power and performance in a multi-core processor system in accordance with an illustrative embodiment.

FIG. 11 is a flow diagram depicting the operation for generation of a software thermal profile for optimal power and performance in a multi-core processor system in accordance with an illustrative embodiment. In this illustrative aspect, all the previous thermal indexes and profile information described in FIGS. 6, 7, 8, 9, and 10 are utilized to optimize the scheduling of the various threads of an application or group of applications. The thermal index of the hardware is combined with the thermal index of the software. The scheduling is then optimized to reach the minimum impact of the application running on the system's thermal environment. As an illustrative aspect, it is possible to use thermal management control unit 402 of FIG. 4 to generate a software thermal profile for optimal power and performance in a multi-core processor system.

Memory interface controller 320 provides an interface between element interconnect bus 319 and one or two of extreme data rate I/O cell memory channels 321 and 322. Extreme data rate (XDR™) dynamic random access memory (DRAM) is a high-speed, highly serial memory provided by Rambus. The extreme data rate dynamic random access memory is accessed using a macro provided by Rambus, referred to in this document as extreme data rate I/O cell memory channels 321 and 322.

Memory interface controller 320 is only a slave on element interconnect bus 319. Memory interface controller 320 acknowledges commands in its configured address range(s), corresponding to the memory in the supported hubs.

Bus interface controllers 324 and 325 manage data transfer on and off the chip from element interconnect bus 319 to either of two external devices. Bus interface controllers 324 and 325 may exchange non-coherent traffic with an I/O device, or it can extend element interconnect bus 319 to another device, which could even be another cell broadband engine chip. When used to extend the element interconnect bus, coherency is maintained between caches in the Cell Broadband Engine and caches in the external device attached.

I/O interface controller 326 handles commands that originate in an I/O interface device and that are destined for the coherent element interconnect bus 319. An I/O interface device may be any device that attaches to an I/O interface such as an I/O bridge chip that attaches multiple I/O devices or another cell broadband engine chip 300 that is accessed in a non-coherent manner. I/O interface controller 326 also intercepts accesses on element interconnect bus 319 that are destined to memory-mapped registers that reside in or behind an I/O bridge chip or non-coherent cell broadband engine chip 300, and routes them to the proper I/O interface. I/O interface controller 326 also includes internal interrupt controller (IIC) 349 and I/O address translation unit (I/O Trans) 350.

Although specific examples of how the different components may be implemented have been provided, this is not meant to limit the architecture in which the aspects of the illustrative embodiments may be used. The aspects of the illustrative embodiments may be used with any multi-core processor system.

During the execution of an application, the temperature of areas within the cell broadband engine chip may rise. Left unchecked, the temperature could rise above the maximum specified junction temperature leading to improper operation or physical damage. To avoid these conditions, the cell broadband engine chip's digital thermal management unit monitors and attempts to control the temperature within the cell broadband engine chip during operation. The digital thermal management unit consists of a thermal management control unit (TMCU) and ten distributed digital thermal sensors (DTSs).

One sensor is located in each of the eight synergistic processor elements, one is located in the Power PC® process element, and one is adjacent to the linear thermal diode. The linear thermal diode is an on-chip diode that calculates temperature. These sensors are positioned adjacent to areas within the associated unit that typically experience the greatest rise in temperature during the execution of most applications. The thermal control unit monitors feedback from each of these sensors. If the temperature of a sensor rises above a programmable point, the thermal control unit can be configured to cause an interrupt to the Power PC® process element or one or more of the synergistic processor elements and dynamically throttle the execution of the associated Power PC® process element or synergistic processor element(s).

The throttling is accomplished by stopping and running the Power PC® process element or synergistic processor element for a programmable number of cycles. The interrupt allows for privileged software to take corrective action while the dynamic throttling is a hardware device that attempts to keep the temperature within the broadband engine chip below a programmable level without software intervention. Privileged software sets the throttling level equal to or below recommended settings.

If throttling the Power PC® process element, synergistic processor elements, or privileged software does not effectively manage the temperature and the temperature continues to rise, the cell broadband engine chip's clocks are stopped when the temperature reaches a thermal overload temperature defined by the configuration data. The thermal overload feature protects the cell broadband engine chip from physical damage. Recovery from this condition requires a hard reset. Note: The temperature of the region monitored by the digital thermal sensors is not necessarily the hottest point within the associated Power PC® process element or synergistic processor element.

Figure 4:
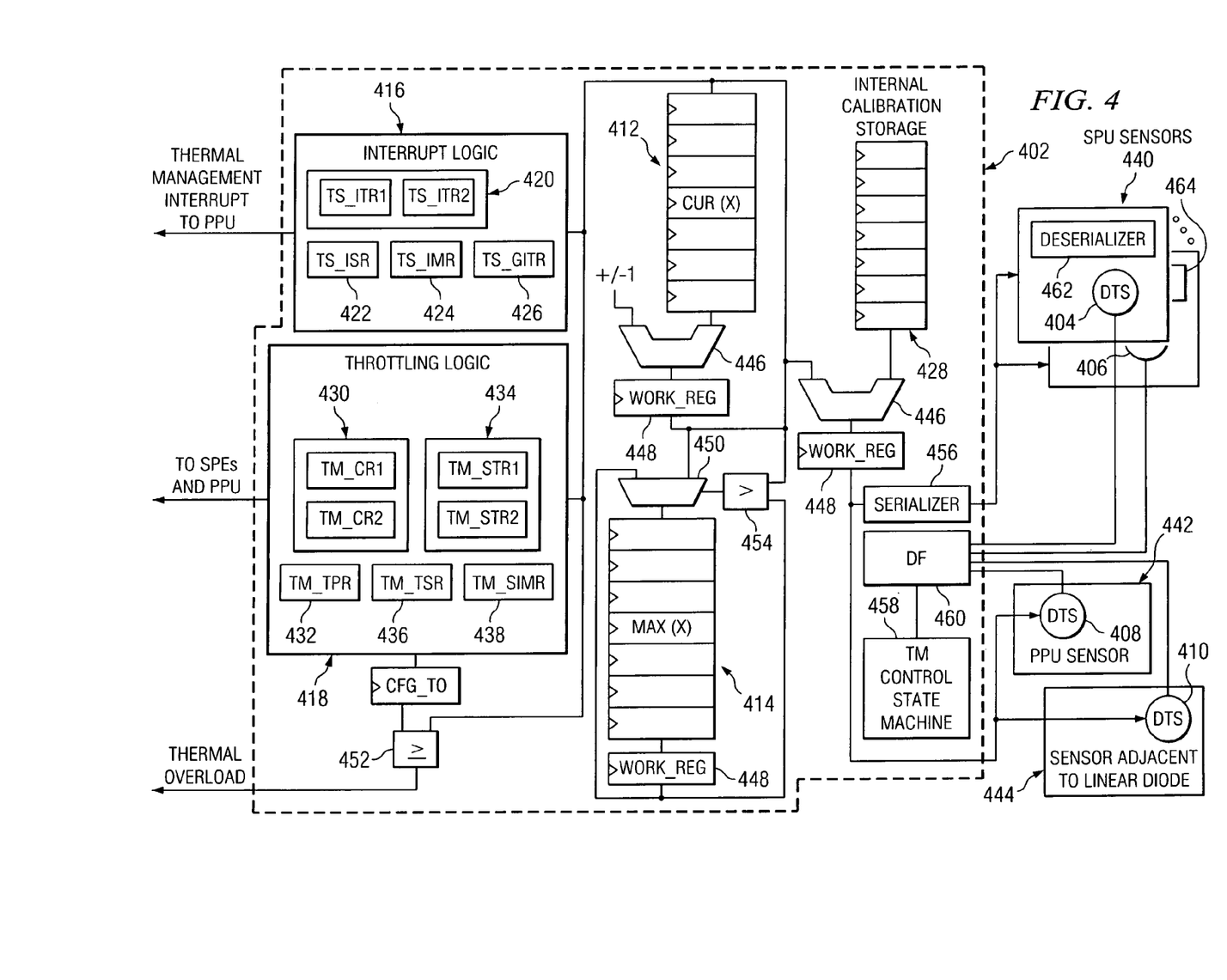
FIG. 4 illustrates an exemplary cell broadband engine chip thermal management system in accordance with an illustrative embodiment.

FIG. 4 illustrates an exemplary cell broadband engine chip thermal management system provided through pervasive logic unit 351 of FIG. 3 in accordance with an illustrative embodiment. Cell broadband engine chip thermal management is split between ten distributed digital thermal sensors (DTSs), for simplicity only digital thermal sensors 404, 406, 408, and 410 are shown, and thermal management control unit (TMCU) 402. Each of digital thermal sensors 404 and 406, which are in synergistic processor unit sensors (SPU) 440, digital thermal sensor 408, which is in Power PC® processor unit sensor 442, and digital thermal sensor 410, which is in sensor 444 that is adjacent to the linear diode, provide a current temperature detection signal, indicating that the temperature is equal to or below the current temperature detection range set by thermal management control unit 402. Thermal management control unit 402 uses the state of the signals from digital thermal sensors 404, 406, 408, and 410 to continually track the temperature of each Power PC® process element's or synergistic processor element's digital thermal sensors 404, 406, 408, and 410. As the temperature is tracked, thermal management control unit 402 provides the current temperature as a numeric value that represents the temperature within the associated Power PC® process element or synergistic processor element. Internal calibration storage 428 is set in manufacturing to calibrate the individual sensors.

In addition to the elements of thermal management control unit 402 described above, thermal management control unit 402 also contains multiplexers 446 and 450, work registers 448, comparators 452 and 454, serializer 456, thermal management (TM) control state machine 458, and data flow (DF) unit 460. Multiplexers 446 and 450 combine various outgoing and incoming signals for transmission over a single medium. Work registers 448 are used for holding the results of multiplications performed in thermal management control unit 402. Comparators 452 and 454 provide a comparison function of two inputs. Comparator 452 is a greater than or equal to comparator. Comparator 454 is a greater than comparator. Serializer 456 converts low-speed parallel data from a source into high-speed serial data for transmission. Serializer 456 works in conjunction with deserializers 462 and 464 on synergistic processor unit sensors 440. Deserializers 462 and 464 converts received high-speed serial data into low-speed parallel data. Thermal management control state machine 458 is used to start the internal initialization of thermal management control unit 402. Data flow unit 460 controls the data to and from thermal management control state machine 458.

Thermal management control unit 402 may be configured to cause an interrupt to the Power PC® process element, using interrupt logic 416, and dynamically throttle the execution of a Power PC® process element or a synergistic processor element, using throttling logic 418. Thermal management control unit 402 compares the numeric value representing the temperature to a programmable interrupt temperature and a programmable throttle point. If the temperature is within the programmed interrupt temperature range, an external interrupt is generated to the Power PC® process element, if enabled.

In addition, a second programmable interrupt temperature can cause the assertion of an attention signal to a system controller. If the temperature is equal to or above the throttling point, thermal management control unit 402 throttles the execution of a Power PC® process element or an synergistic processor element by starting and stopping that Power PC® process element or synergistic processor element dynamically. Software can control the ratio and frequency of the throttling using the dynamic thermal management registers.

Figure 5:
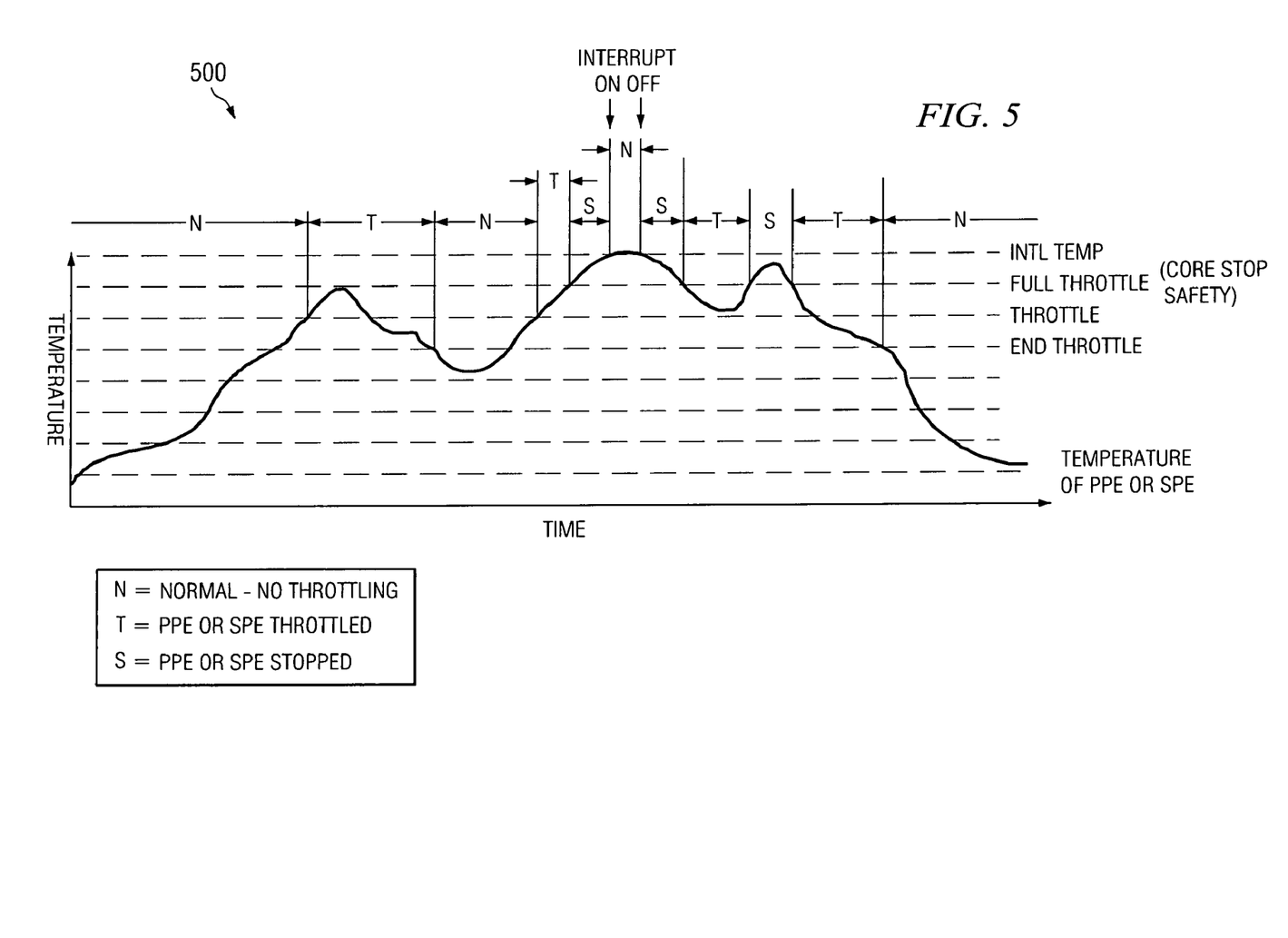
FIG. 5 illustrates the temperature and the various points at which interrupts and dynamic throttling may occur in accordance with an illustrative embodiment.

FIG. 5 is a graph of temperature and the various points at which interrupts and dynamic throttling may occur in accordance with an illustrative embodiment. In FIG. 5, line 500 represents the temperature for the Power PC® process element or if the synergistic processor element is running normally; there is no throttling in the regions marked with an "N". When the temperature reaches the throttle point, the thermal management control unit starts throttling the execution of the associated Power PC® process element or synergistic processor element. The regions in which the throttling occurs are marked with a "T". When the temperature of the Power PC® process element or synergistic processor element drops below the end throttle point, the execution returns to normal operation.

If, for any reason, the temperature continues to rise and reaches a temperature at or above the full throttle point, the Power PC® process element or synergistic processor element is stopped until the temperature drops below the full throttle point. Regions where the Power PC® process element or synergistic processor element is stopped are marked with an "S". Stopping the Power PC® process element or synergistic processor elements when the temperature is at or above the full throttle point is referred to as the core stop safety.

In this exemplary illustration, the interrupt temperature is set above the throttle point; therefore, software is notified if the Power PC® process element or synergistic processor elements is ever stopped for this condition; provided that the thermal interrupt mask register (TM_ISR) is set to active, allowing the Power PC® process element or synergistic processor element to resume during a pending interrupt. If dynamic throttling is disabled, privileged software manages the thermal condition. Not managing the thermal condition can result in an improper operation of the associated Power PC® process element or synergistic processor element or a thermal shutdown by the thermal overload function.

Returning to FIG. 4, the thermal sensor status registers consist of thermal sensor current temperature status registers 412 and thermal sensor maximum temperature status registers 414. These registers allow software to read the current temperature of each digital thermal sensor, determine the highest temperature reached during a period of time, and cause an interrupt when the temperature reaches a programmable temperature. The thermal sensor status registers have associated real address pages which may be marked as hypervisor privileged.

Thermal sensor current temperature status registers 412 contain the encoding for the current temperature of each digital thermal sensor. Due to latencies in the sensor's temperature detection, latencies in reading these registers, and normal temperature fluctuations, the temperature reported in these registers is that of an earlier point in time and might not reflect the actual temperature when software receives the data. As each sensor has dedicated control logic, all sensors are sampled in parallel. The contents of these registers are updated at the beginning of the next sample period. The length of a sample period is controlled by a SenSampTime configuration field.

Thermal sensor maximum temperature status registers 414 contain the encoding for the maximum temperature reached for each sensor from the time of the last read of these registers. Reading these registers causes thermal management control unit 402 to copy the current temperature for each sensor into the register. After the read, thermal management control unit 402 continues to track the maximum temperature starting from this point. Each register's read is independent. A read of one register does not affect the contents of the other. Each sensor has dedicated control logic, so all sensors are sampled in parallel. The contents of these registers are updated at the beginning of the next sample period. The length of a sample period is controlled by a SenSampTime configuration field.

Thermal sensor interrupt registers in interrupt logic 416 control the generation of a thermal management interrupt to the Power PC® processor element. This set of registers consists of thermal sensor interrupt temperature registers 420 (TS_ITR1 and TS_ITR2), thermal sensor interrupt status register 422 (TS_ISR), thermal sensor interrupt mask register 424 (TS_IMR), and the thermal sensor global interrupt temperature register 426 (TS_GITR). Thermal sensor interrupt temperature registers 420 and the thermal sensor global interrupt temperature register 426 contain the encoding for the temperature that causes a thermal management interrupt to the Power PC® processor element.

When the temperature encoding in thermal sensor current temperature status registers 412 for a sensor is greater than or equal to the corresponding sensor's interrupt temperature encoding in thermal sensor interrupt temperature registers 420, the corresponding status bit in thermal sensor interrupt status register 422 (TS_ISR[Sx]) is set. When the temperature encoding in thermal sensor current temperature status registers 412 for any sensor is greater than or equal to the global interrupt temperature encoding in thermal sensor global interrupt temperature register 426, the corresponding status bits thermal sensor interrupt status register 422 (TS_ISR[Gx]) are set.

If any thermal sensor interrupt temperature status register 422 bit (TS_ISR[Sx]) is set and the corresponding mask bit in the thermal sensor interrupt mask register 424 (TS_IMR[Mx]) is also set, a thermal management interrupt signal is asserted to the Power PC® processor element. If any thermal sensor interrupt status register 422 (TS_ISR[Gx]) bit is set and the corresponding mask bit in the thermal sensor interrupt mask register 424 (TS_IMR[Cx]) is also set, a thermal management interrupt signal is asserted to the Power PC® processor element.

To clear the interrupt condition, privileged software should set any corresponding mask bits in thermal sensor interrupt mask register to '0'. To enable a thermal management interrupt, privileged software ensures that the temperature is below the interrupt temperature for the corresponding sensors and then perform the following sequence. Enabling an interrupt when the temperature is not below the interrupt temperature can result in an immediate thermal management interrupts being generated.

1. Write a '1' to the corresponding status bit in the thermal sensor interrupt status register 422.
2. Write a '1' to the corresponding mask bit in the thermal sensor interrupt mask register 424.

The thermal sensor interrupt temperature registers 420 contain the interrupt temperature level for the sensors located in the synergistic processor elements, Power PC® processor element, and adjacent to the linear thermal diode. The encoded interrupt temperature levels in this register are compared to the corresponding interrupt temperature encoding in the thermal sensor current temperature status registers 412. The results of these comparisons are used to generate a thermal management interrupt. Each sensor's interrupt temperature level is independent.

In addition to the independent interrupt temperature levels set in the thermal sensor interrupt temperature registers 420; the thermal sensor global interrupt temperature register 426 contains a second interrupt temperature level. This level applies to all sensors in the cell broadband engine chip. The encoded global interrupt temperature level in this register is compared to the current temperature encoding for each sensor. The results of these comparisons are used to generate a thermal management interrupt.

The intent of the global interrupt temperature is to provide an early indication to a temperature rise in the cell broadband engine chip. Privileged software and the system controller may use this information to start actions to control the temperature, for example, increasing the fan speed, rebalancing the application software across units, and so on.

Thermal sensor interrupt status register 422 identifies which sensors meet the interrupt conditions. An interrupt condition refers to a particular condition that each thermal sensor interrupt status register 422 bit has that, when met, makes it possible for an interrupt to occur. An actual interrupt is only presented to the Power PC® processor element if the corresponding mask bit is set.

Thermal sensor interrupt status register 422 contains three sets of status bits—the digital sensor global threshold interrupt status bit (TS_ISR[Gx]), the digital sensor threshold interrupt status bit (TS_ISR[Sx]), and the digital sensor global below threshold interrupt status bit (TS_ISR[Gb]).

Hardware sets the status bit in thermal sensor interrupt status register 422 (TS_ISR[Sx]) when the temperature encoding for a sensor in thermal sensor current temperature status registers 412 is greater than or equal to the corresponding sensor's interrupt temperature encoding in thermal sensor interrupt temperature registers 420 and the corresponding direction bit thermal sensor interrupt mask register 424, TM_IMR[Bx]='0'. Additionally, hardware sets thermal sensor interrupt status register 422, TS_ISR[Sx], when the temperature encoding for a sensor in thermal sensor current temperature status registers 412 is below the corresponding sensor's interrupt temperature encoding in thermal sensor interrupt temperature registers 420 and the corresponding direction bit thermal sensor interrupt mask register 424, TM_IMR[Bx]='1'.

Hardware sets thermal sensor interrupt status register 422, TS_ISR[Gx], when any participating sensor's current temperature is greater than or equal to that of thermal sensor global interrupt temperature register 426 and thermal sensor interrupt mask register 424, TS_IMR[BG], is set to '0'. The individual thermal sensor interrupt status register 422, TS_ISR[Gx], bits indicate which individual sensors meet these conditions.

Hardware sets thermal sensor interrupt status register 422, TS_ISR[Gb], when all of the participating sensors in thermal sensor interrupt mask register 424, TS_IMR[Cx], have a current temperature below that of thermal sensor global interrupt temperature register 426 and the thermal sensor interrupt mask register 424, TS_IMR[BG], is set to '1'. Since all participating sensors have a current temperature below that of the thermal sensor global interrupt temperature register 426, only one status bit thermal sensor interrupt status register 422 (TS_ISR[Gb]) is present for a global below threshold interrupt condition.

Once a status bit in the thermal sensor interrupt status register 422 (TS_ISR[Sx], [Gx], or [Gb]) is set to '1', this state is maintained until reset to '0' by privileged software. Privileged software resets a status bit to '0' by writing a '1' to the corresponding bit in thermal sensor interrupt status register 422.

The thermal sensor interrupt mask register 424 contains two fields for individual sensors and multiple fields for global interrupt conditions. An interrupt condition refers to a particular condition that each thermal sensor interrupt mask register 424 bit has that, when met, makes it possible for an interrupt to occur. An actual interrupt is only presented to the Power PC® processor element if the corresponding mask bit is set.

The two thermal sensor interrupt mask register digital thermal threshold interrupt fields for individual sensors are TS_IMR[Mx] and the TS_IMR[Bx]. Thermal sensor interrupt mask register 424, TS_IMR[Mx], mask bits prevent an interrupt status bit from generating a thermal management interrupt to the Power PC® processor element. Thermal sensor interrupt mask register 424, TS_IMR[Bx], directional bits set the temperature direction for the interrupt condition above or below the corresponding temperature in thermal sensor interrupt temperature registers 420. Setting thermal sensor interrupt mask register 424, TS_IMR[Bx], to '1' sets the temperature for the interrupt condition to be below the corresponding temperature in thermal sensor interrupt temperature registers 420. Setting thermal sensor interrupt mask register 424, TS_IMR[Bx], to '0' sets the temperature for the interrupt condition to be equal to or above the corresponding temperature in thermal sensor interrupt temperature registers 420.

Thermal sensor interrupt mask register 424 fields for the global interrupt conditions are TS_IMR[Cx], TS_IMR[BG], TS_IMR[Cgb], and TS_IMR[A]. Thermal sensor interrupt mask register 424, TS_IMR[Cx], mask bits prevent global threshold interrupts and select which sensors participate in the global below threshold interrupt condition. Thermal sensor interrupt mask register 424, TS_IMR[BG], directional bit selects the temperature direction for the global interrupt condition. Thermal sensor interrupt mask register 424, TS_IMR[Cgb], mask bit prevents global below threshold interrupts. Thermal sensor interrupt mask register 424, TS_IMR[A], asserts an attention to the system controller.

Setting thermal sensor interrupt mask register 424, TS_IMR[BG], to '1' sets a temperature range for the global interrupt condition to occur when the temperatures of all the participating sensors set in thermal sensor interrupt mask register 424, TS_IMR[Cx], are below the global interrupt temperature level. Setting thermal sensor interrupt mask register 424, TS_IMR[BG], to '0' sets a temperature range for the global interrupt condition to occur when the temperature of any of the participating sensors is greater than or equal to the corresponding temperature in thermal sensor global interrupt temperature register 426. If thermal sensor interrupt mask register 424, TS_IMR[A], is set to '1', an attention is asserted when any thermal sensor interrupt mask register 424, TS_IMR[Cx], bit and its corresponding thermal sensor interrupt status register 422 status bit (TS_ISR[Gx]) are both set to '1'. Additionally, an attention is asserted when thermal sensor interrupt mask register 424, TS_IMR[Cgb], and thermal sensor interrupt status register 422, TS_ISR[Gb], are both set to '1'.

A thermal management interrupt is presented to the Power PC® processor element when any thermal sensor interrupt mask register 424, TS_IMR[Mx], bit and its corresponding thermal sensor interrupt status register 422 status bit (TS_ISR[Sx]) are both set to '1'. A thermal management interrupt is also generated when any thermal sensor interrupt mask register 424, TS_IMR[Cx], bit and its corresponding thermal sensor interrupt status register 422 status bit, TS_ISR[Gx], are both set to '1'. Additionally, a thermal management interrupt is presented to the Power PC® processor element when thermal sensor interrupt mask register 424, TS_IMR[Cgb], and thermal sensor interrupt status register 422, TS_ISR[Gb], are both set to '1'.

The dynamic thermal management registers in throttling logic 418 contain parameters for controlling the execution throttling of a Power PC® processor element or a synergistic processor element. Dynamic thermal management registers is a set of registers that contains thermal management control registers 430 (TM_CR1 and TM_CR2), thermal management throttle point register 432 (TM_TPR), thermal management stop time registers 434 (TM_STR1 and TM_STR2), thermal management throttle scale register 436 (TM_TSR), and thermal management system interrupt mask register 438 (TM_SIMR).

Thermal management throttle point register 432 sets the throttle point for the sensors. Two independent throttle points can be set in thermal management throttle point register 432, ThrottlePPE and ThrottleSPE, one for the Power PC® processor element and one for the synergistic processor elements. Also contained in this register are temperature points for exiting throttling and stopping the Power PC® processor element or synergistic processor elements. Execution throttling of a Power PC® processor element or a synergistic processor element starts when the temperature is equal to or above the throttle point. Throttling ceases when the temperature drops below the temperature to exit throttling (TM_TPR[EndThrottlePPE/EndThrottleSPE]). If the temperature reaches the full throttle or stop temperature (TM_TPR[FullThrottlePPE/FullThrottleSPE]), the execution of the Power PC® processor element or synergistic processor element is stopped. Thermal management control registers 430 are used to control the throttling behavior.

Thermal management stop time registers 434 and thermal management throttle scale register 436 are used to control the frequency and amount of throttling. When the temperature reaches the throttle point, the corresponding Power PC® processor element or synergistic processor element is stopped for the number of clocks specified by the corresponding scale value in thermal management throttle scale register 436. The Power PC® processor element or synergistic processor element is then allowed to run for the number of clocks specified by the run value in thermal management stop time registers 434 times the corresponding scale value. This sequence continues until the temperature falls below the exit throttling (TM_TPR[EndThrottlePPE/EndThrottleSPE]).

Thermal management system interrupt mask register 438 is used to select which interrupts exit throttling of the Power PC® processor element while the interrupt is pending.

Thermal management control registers 430 set the throttling mode for each Power PC® processor element or synergistic processor element independently. The control bits are split between two registers. Following are the five different modes that may be set for each Power PC® processor element or synergistic processor element independently.

Dynamic throttling disabled (including the core stop safety).

Normal operation (dynamic throttling and the core stop safety are enabled).

Power PC® processor element or synergistic processor element is always throttled (core stop safety is enabled).

Core stop safety disabled (dynamic throttling enabled and the core stop safety are disabled).

Power PC® processor element or synergistic processor element is always throttled and core stop safety disabled.

Privileged software should set control bits to normal operation for Power PC® processor element or synergistic processor elements that are running applications or operating systems. If a Power PC® processor element or a synergistic processor element is not running application code, privileged software should set the control bits to disabled. The "Power PC® processor element or synergistic processor element is always throttled" modes are intended for application development. These modes are useful to determine if the application can operate under an extreme throttling condition. Allowing a Power PC® processor element or an synergistic processor element to execute with either the dynamic throttling or core stop safety disabled should only be permitted when privileged software actively manages the thermal events.

Thermal management system interrupt mask register 438 controls which Power PC® processor element interrupts cause the thermal management logic to temporarily stop throttling the Power PC® processor element. Throttling is temporarily suspended for both threads while the interrupt is pending, regardless of the thread targeted by the interrupt. When the interrupt is no longer pending, throttling can resume as long as throttle conditions still exist. Throttling of the synergistic processor elements is never exited based on a system interrupt condition. The Power PC® processor element interrupt conditions that can override a throttling condition are as follows:

External
Decrementer
Hypervisor Decrementer
System Error
Thermal Management

Thermal management throttle point register 432 contains the encoded temperature points at which execution throttling of a Power PC® processor element or an synergistic processor element begins and ends. This register also contains encoded temperature points at which a Power PC® processor element's or an synergistic processor element's execution is fully throttled.

The values in the thermal management throttle point register are used to set three temperature points for changing between the three thermal management states: normal run (N), Power PC® processor element or synergistic processor element throttled (T), and Power PC® processor element or synergistic processor element stopped (S). Independent temperature points are supported for the Power PC® processor element and the synergistic processor elements.

When the encoded current temperature of a sensor in thermal sensor current temperature status registers 412 is equal to or greater than the throttle temperature (ThrottlePPE/ThrottleSPE), execution throttling of the corresponding Power PC® processor element or synergistic processor element begins, if enabled. Execution throttling continues until the encoded current temperature of the corresponding sensor is less than the encoded temperature to end throttling (EndThrottlePPE/EndThrottleSPE). As a safety measure, if the encoded current temperature is equal to or greater than the full throttle point (FullThrottlePPE/FullThrottleSPE), the corresponding Power PC® processor element or synergistic processor element is stopped.

Thermal management stop time registers 434 control the amount of throttling applied to a specific Power PC® processor element or synergistic processor element in the thermal management throttled state. The values in thermal management stop time registers are expressed in a percentage of time that a Power PC® processor element or a synergistic processor element is stopped versus the time that it is run (core-stop(x)/32). The actual number of clocks (NClks) that a Power PC® processor element or a synergistic processor element stops and runs is controlled by the thermal management throttle scale register 436.

Thermal management throttle scale register 436 controls the actual number of cycles that a Power PC® processor element or a synergistic processor element stops and runs during the thermal management throttle state. The values in this register are multiples of a configuration ring setting TM_Config[MinStopSPE]. The actual number of stop and run cycles is calculated by the following equation:

Synergistic processor element Run and Stop Time:

$SPE\_StopTime = (TM\_STR1[StopCore(x)]*TM\_Config[MinStopSPE])*TM\_TSR[ScaleSPE]$ $SPE\_RunTime = (32-TM\_STR1[StopCore(x)])*TM\_Config[MinStopSPE])*TM\_TSR[ScaleSPE]$ Power PC® element Run and Stop Time:

$PPE\_StopTime = (TM\_STR2[StopCore(8)]*TM\_Config[MinStopPPE])*TM\_TSR[ScalePPE]$ $PPE\_RunTime = (32-TM\_STR2[StopCore(8)])*TM\_Config[MinStopPPE])*TM\_TSR[ScalePPE]$ The run and stop times can be altered by interrupts and privileged software writing various thermal management registers.

Although the following descriptions are directed to one instruction stream and one processor, the instruction stream may be a set of instruction streams, and the processor may be a set of processors. That is, a set may be just a single instruction stream and single processor or two or more instructions streams and processors.

Figure 6:
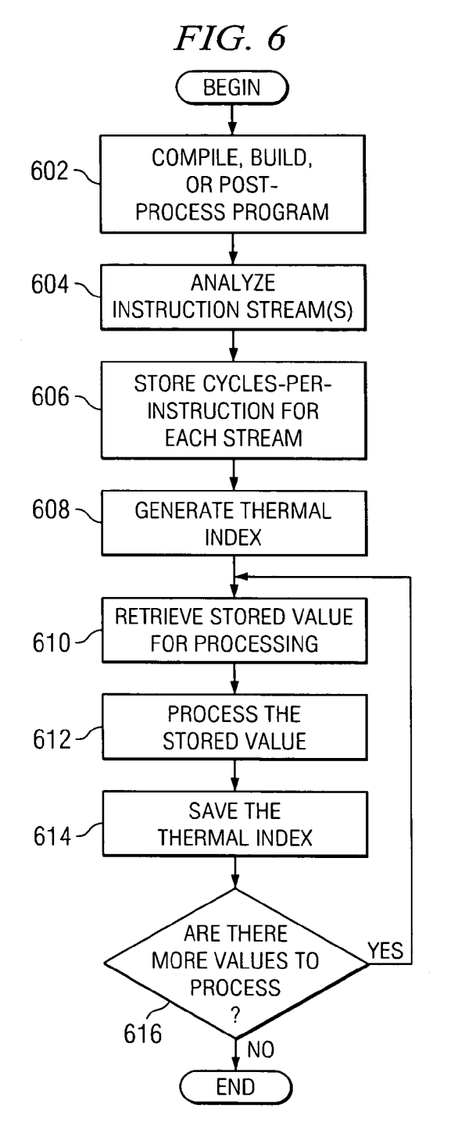
FIG. 6 is a flow diagram depicting the operation for analytical generation of software thermal profiles in accordance with an illustrative embodiment.

FIG. 6 is a flow diagram depicting the operation for analytical generation of software thermal profiles in accordance with an illustrative embodiment. A software thermal profile may also be called a software thermal index. A software thermal profile is a data structure containing information about the thermal characteristics of the hardware and/or software.

As the operation begins, a compiling, building, or post-processing of a program or application executing on a set of processors is performed (step 602). The instruction stream of the compiling, building, or post-processing program is analyzed in order to estimate the cycles-per-instruction (CPI) efficiency of the compiling, building, or post-processing program (step 604). Compilers need to understand the details of the micro-architecture to optimize the object code. With this knowledge, the compiler gives each instruction a fixed cycles-per-instruction (CPI) based on the instruction type and operand dependencies. The estimated cycles-per-instruction is an approximation of the performance efficiency which can be used to determine the thermal profile or thermal index. The cycles-per-instruction for the program are stored for a predetermined time within a data structure (step 606). The predetermined time may be any time set prior to analyzing the instruction stream of the program. The data structure may be any type of data structure, such as a register or database.

A thermal index is then generated based on the stored values of the cycles-per-instruction (step 608). The generation of the thermal index is described in steps 610-616. Fist, a stored cycles-per-instruction value is retrieved from storage (step 610). The value is processed such that the retrieved value is proportional to the inverse of the cycles-per-instruction (step 612). The processed value is saved as a thermal index (step 614). A determination is made as to whether there are any additional unprocessed stored values (step 616). If at step 616, there are additional stored valued that need to be processed, the operation returns to step 610, otherwise the operation ends. In this illustrative aspect, the thermal index is proportional to the inverse of the cycles-per-instruction (1/CPI). Programs with lower cycles-per-instruction values use more machine resources, and, thus, have a higher impact on the system's thermal environment (e.g. the temperature of the processor is increased with lower CPIs). Although cycles-per-instruction of the information stream are used in this illustrative embodiment, other metrics may also be user to calculate a thermal index, such as cycles-per-byte transferred of an execution units or data flow units.

The thermal index generated for the program in steps 608-616 may be generated by a compiler. In a simple form in these examples, the thermal index may be a single number or a weighted sum of the analyzed information representing the intensity of various execution units and data flow units. Alternatively, a vector of values for each of the processor's execution units and data flow units might also be used. A thermal index is generated for an application. The hardware also has a thermal index which is based on implementation of the core. Thermal maps, thermal efficiency of the core, location on the die, etc. may be used to generate this thermal index. The two thermal indexes may then be used together to more accurately represent the thermal characteristics of an application running on a selected core. In an illustrative embodiment, the thermal index would include standard deviation information in order to more accurately represent software's peak, and not just average, thermal impact on the system. The thermal index may be included with the program header information, such as an ELF-note.

An exemplary implementation of the process in FIG. 6 is as follows. A compiler is used to generate object code for an application. During the compilation, the compiler can examine the instruction sequence. Using detailed knowledge of the micro-architecture, an estimated CPI is generated for the object code. The inverse of the CPI is then stored in a data structure. The contents of the data structure can then be used by a loader to determine the best core for which to run the application. The loader can also combine the application thermal index with the core's thermal index to further optimize the thermal impacts of the application on the system's thermal environment.

The advantage approach in this illustrative embodiment versus empirically measuring temperature, processor activity is that the empirical measurement couples the resulting software thermal index to a particular multi-core processor chip and workload level, where this approach represents an ideal value for the software. Additionally, this illustrative embodiment is not tied to a particular chip or system workload level.

Software compiling, building, and/or post processing on microprocessor architecture will utilize a set of machine resources. Through careful analysis of the software, coupled with detailed knowledge of the micro-processor architecture, it is possible to estimate how efficiently the software will use the machine's resources. Resource efficiency (intensity) would be an indicator of the software's thermal impact.

Figure 7:
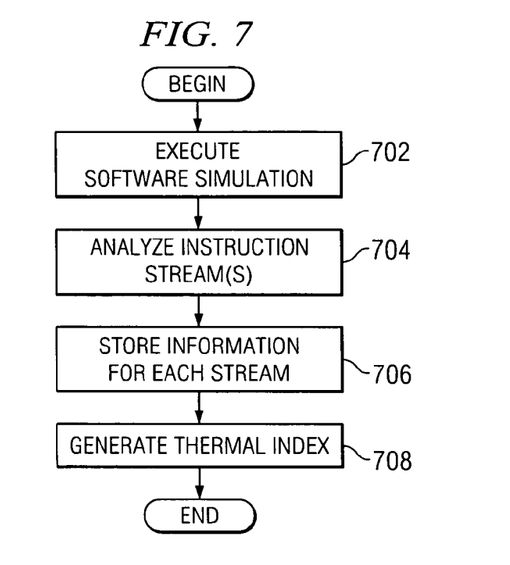
FIG. 7 is a flow diagram depicting the operation for generation of software thermal profiles by run-time execution in a simulated environment in accordance with an illustrative embodiment.

FIG. 7 is a flow diagram depicting the operation for generation of software thermal profiles by run-time execution in a simulated environment in accordance with an illustrative embodiment. As an illustrative aspect, it is possible to use thermal management control unit 402 of FIG. 4 to generate a thermal profile using run-time execution in a simulated environment.

As the operation begins, a software program or application executing on a set of processors is executed on a software simulator (step 702). As the software simulation is performed, the types and frequency of the hardware operations that are being performed on the processor(s) are analyzed (step 704). In this illustrative aspect of a cycle based simulator is used to more accurately generate the cycles-per-instruction (CPI). An example would be post-processing the object code generated by the compiler. The instruction sequence is simulated using a cycle based simulator to determine the number of cycles required to execute the instruction stream. The CPI is an approximation of the performance efficiency which can be used to determine the thermal profile or thermal index.

Simulators need to understand the details of the micro-architecture to simulate the operation of the processor. With this knowledge, the simulator can estimate the cycles-per-instruction based on the instruction type and operand dependencies. The estimate is more accurate than can be generated by a compiler. The estimated cycles-per-instruction is an approximation of the performance efficiency which can be used to determine the thermal profile or thermal index. The analyzed information for the software simulation is stored for a predetermined time within a data structure (step 706). The predetermined time may be any time set prior to analyzing the instruction stream of the running program. The data structure may be any type of data structure, such as a register or database. Based on the knowledge of the thermal characteristics of the analyzed hardware, a software thermal index is generated (step 708). The generation of the thermal index is described in steps 610-616 of FIG. 6.

As an example, cycles-per-instruction indicate the intensity which the software simulation uses a micro-processor's internal execution pipelines; in this case, a lower cycles-per-instruction value indicates a higher intensity on the execution pipelines. Likewise, cycles-per-byte indicates the intensity which software utilizes a micro-processor's data flow units.

An exemplary implementation of the process in FIG. 7 is as follows. A compiler is used to generate object code for an application. After compilation, the object code is executed on a cycle based simulator. As part of the simulation of the object code, an accurate cycle count for the instruction sequence of the application is recorded. The number of cycles is then divided by the number of instructions in the sequence to determine the CPI. During the simulation, the simulator can examine the instruction sequence. Using detailed knowledge of the micro-architecture, an estimated CPI is generated for the object code. The inverse of the CPI is then stored in a data structure. The contents of the data structure can then be used by a loader to determine the best core for which to run the application. The loader can also combine the application thermal index with the core's thermal index to further optimize the thermal impacts of the application on the system's thermal environment.

The advantage to this method versus empirically measuring temperature and processor activity on a multi-core processor is that the empirical measurement couples the resulting software thermal index to a particular multi-core processor chip, where this method represents an ideal value for the software and is not tied to a particular chip. This, in turn, can be fed back to a compiler in order to optimize software for a particular multi-processor chip and system workload.

Figure 8:
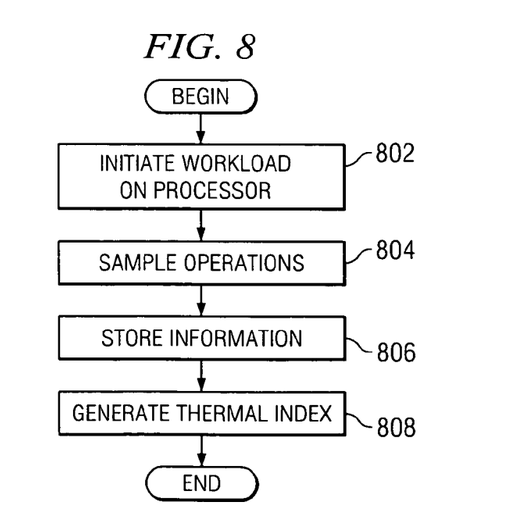
FIG. 8 is a flow diagram depicting the operation for generation of software thermal profiles by run-time execution on a multi-core processor and measuring processor activity in accordance with an illustrative embodiment.

FIG. 8 is a flow diagram depicting the operation for generation of software thermal profiles by run-time execution on a multi-core processor and measuring processor activity in accordance with an illustrative embodiment. As an illustrative aspect, it is possible to use thermal management control unit 402 of FIG. 4 to generate a thermal profile using run-time execution on a multi-core processor and measuring processor activity.

As the operation begins, various workloads, such as programs or applications, are executed on one or more of the processors (step 802). Using the application gives a more accurate indication of the thermal index for a specific application. While workloads are less accurate, they cover a broader range of applications, which eliminates the need to perform the analysis for each specific application. Workloads are chosen to represent the type of code typically executed by the target market segments for the system. A workload is a small code segment which represents the computational aspects of an application space. It is possible to have several thermal index values, one for each market segment. As an example, a Fast Fourier Transform (FFT) workload would be chosen to represent the typical computational intensive work performed in the Geo-science market segment (signal analysis). Workloads will have varying effects on the thermal state of a multi-core processor. While the workloads are being executed, sampling the type and frequency of operations through use of instrumentation built into the multi-core processor is performed (step 804). In this illustrative aspect, performance monitoring capability of the processor is used to monitor the activity of an application. One example is to record the number of instruction stalls due to cache misses or operand dependencies. The result is a measure of how efficient the workload or application runs on the hardware. The inverse of the number of stalls is proportional to the applications utilization of the core and thus can be used as a thermal index. The sampling performed in step 804 may be any type of sampling such as discussed with relation to thermal sensor current temperature status registers 412 in FIG. 4. Possible measurements may include, for example instruction stalls or activity, cache activity, bus activity, and memory accesses, for each core. The information obtained from the sampling and knowledge of the thermal characteristics of the processor are then stored for a predetermined time within a data structure (step 806). The predetermined time may be any time set prior to analyzing the instruction stream of the running program. The data structure may be any type of data structure, such as a register or database. The stored information may then used to generate a software thermal index for the software module to predict the thermal effect on the multi-core processor (step 808), with the operation ending thereafter. The generation of the thermal index is described in steps 610-616 of FIG. 6.

One example of how the information stored in the data structure is converted to a thermal index is to use a weighted sum of the information. For example, as the number of cache misses increase, the overall activity of the process is lower and will have a lower thermal effect on the processor. In this case, the actual weighting of cache misses may be negative. The weights will depend on the information stored in the data structure. This all assumes that the thermal index is a measure of the thermal effects of an application on the processor. The higher the thermal index the more potential for the application to raise the temperature of the processor.

The advantage to this method versus analytic estimation is that the empirical measurement couples the resulting software "thermal index" to a particular multi-processor chip and system workload. This, in turn, can be fed back to a compiler in order to optimize software for a particular multi-processor chip and system workload.

Figure 9:
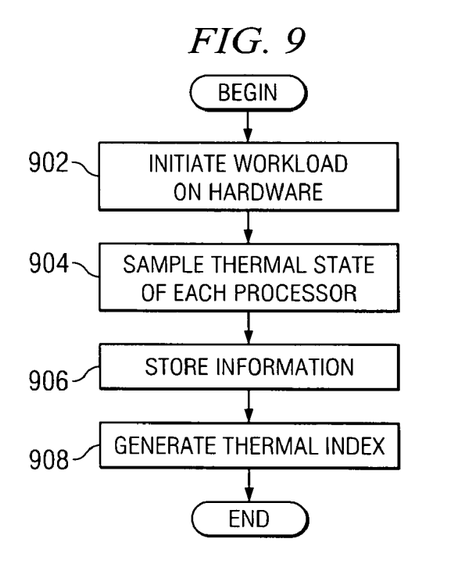
FIG. 9 is a flow diagram depicting the operation for generation of software thermal profiles by run-time execution on a multi-core processor using thermal sampling in accordance with an illustrative embodiment.

FIG. 9 is a flow diagram depicting the operation for generation of software thermal profiles by run-time execution on a multi-core processor using thermal sampling in accordance with an illustrative embodiment. As an illustrative aspect, it is possible to use thermal management control unit 402 of FIG. 4 to generate a thermal profile using run-time execution on a multi-core processor using thermal sampling.

As the operation begins, various workloads, such as programs or applications, are executed on one or more of the processors (step 902). Using the application gives a more accurate indication of the thermal index for a specific application. While workloads are less accurate, they cover a broader range of applications, which eliminates the need to perform the analysis for each specific application. Workloads will have varying effects on the thermal state of a multi-core processor. While the workloads are being executed, sampling is performed of the thermal state of the multi-core processor (step 904). In this illustrative aspect, thermal management is used. The thermal sensors in the processor are read as the workloads are executed. The result is a thermal graph of the application over time. One example is the temperature graph in FIG. 5, where temperature is represented on the y-axis and time is represented on the x-axis. The information obtained from the sampling of the processor are then stored for a predetermined time within a data structure (step 906). The predetermined time may be any time set prior to analyzing the instruction stream of the running program. The data structure may be any type of data structure, such as a register or database. The stored information may then be used to generate a software thermal index for the software module to predict the thermal effect on the multi-core processor (step 908), with the operation ending thereafter. There are many ways to generate the thermal index for a sampling of temperature while running an application. One example is to take the mean of the recorded temperatures and add the standard deviation or 2 sigma of the variation in the temperature from the mean. Other examples may be the generation of the thermal indexes as described in steps 610-616 of FIG. 6.

The advantage to this method versus analytic estimation is that the empirical measurement couples the resulting software "thermal index" to a particular multi-processor chip, system workload and thermal environment. This, in turn, can be fed back to a compiler in order to optimize software for this environment.

FIG. 10 is a flow diagram depicting the operation for generation of a hardware thermal profile for a multi-core processor in accordance with an illustrative embodiment. A hardware thermal profile is a data structure containing information about the thermal performance of the hardware or system. Some cores on a processor may have better thermal characteristics due to the cores location relative to other cores and the system's cooling solution. A hardware thermal profile may be thought of as a baseline of how the processor responds to thermally intense workloads. This baseline may change based on the environment of the system, (i.e. system is in Texas in the summer, runs very hot.) Thermal maps, thermal efficiency of the core, location on the die, etc., may be used to generate this thermal index. The hardware thermal index may be quite complicated or very simple, such as just the thermal map of the processor. As an illustrative aspect, it is possible to use thermal management control unit 402 of FIG. 4 to generate a thermal profile using run-time execution on a multi-core processor using thermal sampling.

As the operation begins, various workloads, such as programs or applications, are executed on one or more of the processors (step 1002). Workloads will have varying effects on the thermal state of a multi-core processor. While the workloads are being executed, sampling of the thermal state in the multi-core processor is performed (step 1004). For a hardware thermal profile, workloads are selected to represent the maximum thermal operation of the processor. The temperature is sampled by reading the current or maximum temperature registers periodically while the application is running and storing the information into a data structure. In the cell broadband engine, the sampling may be performed in hardware or software. The information obtained from the sampling of the processor are then stored for a predetermined time within a data structure (step 1006). The predetermined time may be any time set prior to analyzing the instruction stream of the running program. The data structure may be any type of data structure, such as a register or database. At this point, a selection is made of one or more previously gathered and stored software thermal profiles of the power and/or performance of the multi-core system (step 1008). The selection may be based on the type of application being loaded and/or executed. The stored information from the sampling of the thermal state of the multi-core processor in combination with the selected software thermal profiles is utilized to optimally manage the multi-core system (step 1010), with the operation ending thereafter. The thermal index generated from the sampled thermal data is used to select which core is best for running the application on, or even if the application should be scheduled at the current time. Likewise, software may use other means for throttling an application which has too high of a thermal index for the current thermal state of the processor. The generation of the thermal index is described in steps 610-616 of FIG. 6.

FIG. 11 is a flow diagram depicting the operation for generation of a software thermal profile for optimal power and performance in a multi-core processor system in accordance with an illustrative embodiment. In this illustrative aspect, all the previous thermal indexes and profile information described in FIGS. 6, 7, 8, 9, and 10 are utilized to optimize the scheduling of the various threads of an application or group of applications. The thermal index of the hardware is combined with the thermal index of the software. The scheduling is then optimized to reach the minimum impact of the application running on the system's thermal environment. As an illustrative aspect, it is possible to use thermal management control unit 402 of FIG. 4 to generate of a software thermal profile for optimal power and performance in a multi-core processor system.

As the operation begins, the process detects when a program has been initialized (step 1102). Prior to the program being initialized, the thermal index or set of thermal indices are generated using one of the previous methods in FIGS. 6, 7, 8, 9, or 10. Steps 1104 and 1106 are an example using the analytical generation of a software thermal index. The instruction stream of the running program is analyzed in order to estimate the cycles-per-instruction (CPI) efficiency of the running program (step 1104). The cycles-per-instruction for the running program are stored for a predetermined time within a data structure (step 1106). The predetermined time may be any time set prior to analyzing the instruction stream of the running program. The data structure may be any type of data structure, such as a register or database. At this point, a selection is made of one or more previously gathered and stored hardware and software thermal profiles of the power and/or performance of the multi-core system (step 1108). The selection is made based on the type of application, if multiple thermal indexes are provided. A user may either have the thermal profile or index of the application, or the user may have a thermal index or profile for a set of workloads which represent the classification of the application.

A thermal index is then generated based on the stored values of the cycles-per-instruction and the hardware and software profiles to optimally manage the power and performance within the system's thermal limitations, such as scheduling the execution of the applications or programs (step 1110), with the operation ending thereafter. In this illustrative aspect, the thermal index is proportional to the inverse of the cycles-per-instruction (1/CPI). Programs with lower cycles-per-instruction values use more machine resources, and, thus, have a higher impact on the system's thermal state. Although cycles-per-instruction of the information stream are used in this illustrative embodiment, other metrics may also be user to calculate a thermal index, such as cycles-per-byte transferred of an execution units or data flow units.

The thermal index generated for the program in step 1110 may be generated by a compiler. In a simple form, the thermal index might be a single number or a weighted sum representing the intensity of various execution units and data flow units. Alternatively, a vector of values for each of the processor's execution units and data flow units might also be used. In an illustrative embodiment, the thermal index would include standard deviation information in order to more accurately represent software's peak, and not just average, thermal impact on the system. The thermal index may be included with the program header information, such as an ELF-note.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for generating at least one hardware thermal profile for a set of processors, the computer implemented method comprising:

sampling a thermal state of the set of processors during execution of a set of workloads to create sampled information;

storing the sampled information in a data structure; and generating a thermal index based on the sampled information stored in the data structure and thermal characteristics of the set of processors to form the at least one hardware thermal profile, wherein the thermal characteristics of the set of processors are indicated by at least one thermal sensor and wherein the thermal index is a thermal efficiency of the set of processors for the set of workloads.

2. The computer implemented method of claim 1, wherein the thermal index is a weighted sum of sampled information representing intensity of at least one of a set of execution units or a set of data flow units.

3. The computer implemented method of claim 1, wherein the thermal index is a vector of values for at least one of a set of execution units or a set of data flow units.

* * * * *